United States Patent [19]

Bradley et al.

[11] Patent Number: 5,002,352
[45] Date of Patent: Mar. 26, 1991

[54] MONOLITHIC ARRAY OF FIBER OPTIC BANDPASS FILTERS

[75] Inventors: Eric M. Bradley, San Diego; Ronald F. Mathis, Ramona, both of Calif.

[73] Assignee: General Dynamics Corp., Electronics Divn., San Diego, Calif.

[21] Appl. No.: 447,044

[22] Filed: Dec. 7, 1989

[51] Int. Cl.$^5$ .............................................. G02B 6/10
[52] U.S. Cl. ................................................ 350/96.12
[58] Field of Search .................. 350/96.12; 372/19, 23, 372/43, 48

[56] References Cited

U.S. PATENT DOCUMENTS

| | | | |
|---|---|---|---|
| 3,806,226 | 4/1974 | Tien | 350/96 |
| 4,372,641 | 2/1983 | Johnson et al. | 350/96 |
| 4,420,873 | 12/1983 | Leonberger et al. | 29/576 E |
| 4,518,219 | 5/1985 | Leonberger et al. | 350/96.12 |
| 4,558,920 | 12/1985 | Newton et al. | 350/96.15 |
| 4,577,924 | 3/1986 | Mathis | 350/96.15 |
| 4,582,390 | 4/1986 | Furuya | 350/96.12 |
| 4,606,602 | 8/1986 | Unger et al. | 350/96.12 |
| 4,652,290 | 3/1987 | Cho et al. | 350/96.12 |
| 4,691,982 | 9/1987 | Nishimura et al. | 350/96.12 |
| 4,693,543 | 9/1987 | Matsummura et al. | 350/96.11 |
| 4,701,008 | 10/1987 | Richard et al. | 350/96.12 |
| 4,701,009 | 10/1987 | Tangonan et al. | 350/96.12 |
| 4,711,514 | 12/1987 | Tangonan et al. | 350/96.12 |

Primary Examiner—William L. Sikes
Assistant Examiner—Robert E. Wise
Attorney, Agent, or Firm—Brown, Martin, Haller & McClain

[57] ABSTRACT

An array of optical RF bandpass filters which is fabricated from planar waveguides on a single substrate. The array of filters receives an input of frequency multiplexed optical signals and separates the intensity modulated optical signal of the desired frequency from signals at other frequencies. Each bandpass filter comprises a resonant cavity formed from a segment of a planar optical waveguide with mirrors deposited at each end. By using ultra high purity CVD techniques common in the optical fiber industry, material absorption is dramatically reduced. Much thicker waveguides are grown than those conventionally fabricated, allowing the use of refractive index differences between waveguide and cladding which are much smaller than those normally used in planar waveguides. To enable the fabrication of a monolithic array of filters having differing center frequencies, the substrate is cut at an angle so that resonant cavities of different lengths are formed.

10 Claims, 1 Drawing Sheet

MONOLITHIC ARRAY OF FIBER OPTIC BANDPASS FILTERS

FIELD OF THE INVENTION

The present invention relates to bandpass filters. More particularly, the present invention relates to optical RF bandpass filters appropriate for use in optical communications and computation systems.

BACKGROUND OF THE INVENTION

New developments in fiber optic transmission systems indicate that frequency division multiplexing (FDM) is desirable to achieve high data rate communications. A limitation is placed on the technology by the fact that bandpass filters necessary to extract the optical signals from the carrier are only manufacturable using discrete fiber optics. This has inhibited the ability to achieve the goal of fully-integrated optics for frequency division multiplexing, in addition to making the components prohibitively expensive due to the required assembly of separately fabricated parts.

Optical RF bandpass filters can be created from optical waveguides by creating a resonant cavity formed of small lengths of optical waveguides, with length being one half the modulation wavelength, so that the RF signal will be extracted from the carrier. The RF bandpass filter is created out of the optical waveguide by deposition of mirrors at both ends. Thus far, only fiber optic technology has been used in the manufacture of RF bandpass filters relying on resonant cavities. Planar waveguides have not been used to form RF bandpass filters up to this point because absorption and scattering have been found to be too great to allow high "Q" resonators to be fabricated. The absorption and scattering found in the planar waveguides have been thought to be caused by surface imperfections at the walls of the waveguide. These factors lead to typical attenuation factors of about 10 dB/m for planar waveguides. The forced reliance on fiber optic-based bandpass filters has prevented the creation of monolithic arrays of optical filters.

It would be desirable to be able to fabricate optical RF bandpass filters using planar technology to allow the fabrication of an array of RF bandpass filters on a single substrate. The array of bandpass filters could be made with varying center frequencies to allow a single substrate to contain multiple bandpass filters. It is to this end that this invention is directed.

SUMMARY OF THE INVENTION

Generally, this invention concerns an array of optical RF bandpass filters which is fabricated from planar waveguides on a single substrate. The array of filters receives an input of frequency multiplexed optical signals and separates the optical signal of the desired frequency from signals at other frequencies. The intensity modulated optical signal will be output from one of the filters in the array.

Each bandpass filter comprises a resonant cavity formed from a segment of a planar optical waveguide with mirrors deposited at each end. By using ultra high purity chemical vapor deposition (CvD) techniques common in the optical fiber industry, material absorption is dramatically reduced. To address scattering, much thicker waveguides are grown than those that are normally fabricated, allowing the use of refractive index differences which are much smaller than those normally used in planar waveguides. To enable the fabrication of a monolithic array of such filters, the substrate is cut at an angle so that resonant cavities of different lengths are formed.

The RF bandpass filter array for extracting light varying in intensity at a plurality of predetermined intensity modulation frequencies from light varying in intensity over a plurality of bands of intensity modulation frequencies comprises a substrate which extends along the path of the light beam into which a plurality of coaxially extending ridges or grooves is formed. A lower cladding layer, consisting of a dielectric which has a selected refractive index, is deposited over the grooves or ridges, over which is deposited an optical waveguide layer at least 20 $\mu$m thick and having a refractive index greater than that of the underlying dielectric. The waveguide layer over the grooves or ridges defines a plurality of waveguides, one waveguide for each groove or ridge. High reflectance mirrors are deposited at each lateral end of each waveguide, the length of the waveguide equal to one half the wavelength of one of plurality of predetermined intensity modulation frequencies contained within a band of intensity modulation frequencies. The ends of the waveguide define a resonant cavity which permits resonance of light at each of a plurality of predetermined intensity modulation frequencies. A portion of the resonating light within the resonant cavity exits through a hole in one of the end mirrors as filtered output light varying in intensity at the predetermined intensity modulation frequency. The lengths of the waveguides increase progressively where the substrate increases laterally in width perpendicular to the direction of the light beam.

BRIEF DESCRIPTION OF THE DRAWINGS

The features of this invention will be more readily apparent from the following detailed description when read in conjunction with the accompanying drawings in which.

DESCRIPTION OF THE PREFERRED EMBODIMENT

Figure 1A:
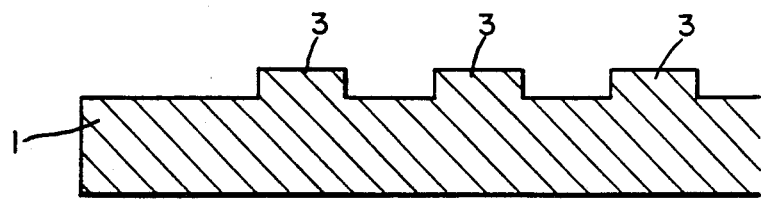
FIG. 1 is a series of cross-sectional views showing the steps forming the waveguides of the present invention.
Figure 1B:
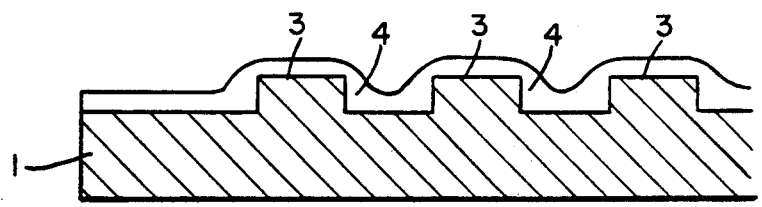
Figure 1C:
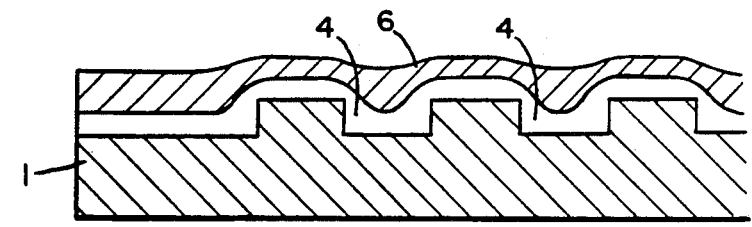
Figure 1D:
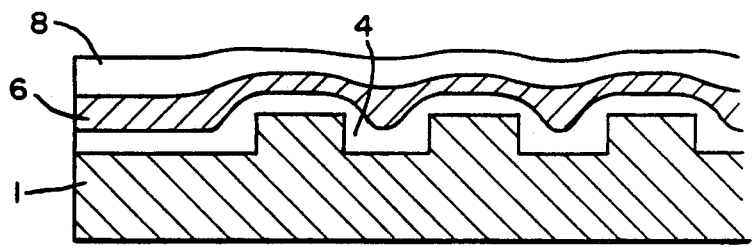
Figure 2:
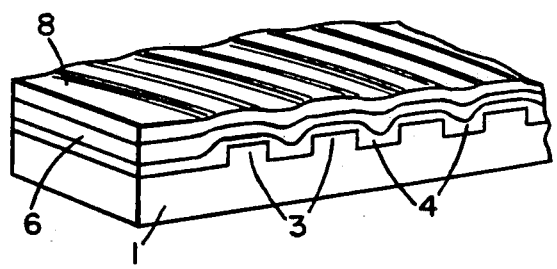
FIG. 2 is a perspective view of a single bandpass filter.

With reference to the figures the physical structure of the preferred embodiment of the present invention this invention is shown.

A dielectric substrate 1 is patterned and etched to form a series of grooves and ridges 3 which run coaxially with the light path. A thin film of dielectric is deposited to form the lower cladding 4. The cladding reflects light back into the waveguide core 6 due to the lower refractive index of the cladding.

A dielectric film, typically SiO2, is deposited using ultra high purity chemical vapor deposition (CVD) techniques to form the optical waveguide layer 6. Layer 6 has a higher refractive index than lower cladding 8, and is greater than 20 $\mu$m thick. This thickness is much greater than the typical thickness of 2-3 $\mu$m used for current planar waveguides, and will preferably be about 100 $\mu$m thick. This allows the refractive index difference ($\Delta$n) between the waveguide layer 6 and the cladding 4 and 8 to be typically less than 0.015, which is much smaller than Δn used in current planar waveguides. Scattered power due to waveguide boundary imperfections is proportional to (Δn)$^4$. By decreasing Δn, scattering losses will be greatly reduced.

Upper cladding layer 8 is deposited and has the same index of refraction as lower cladding 4.

Figure 3:
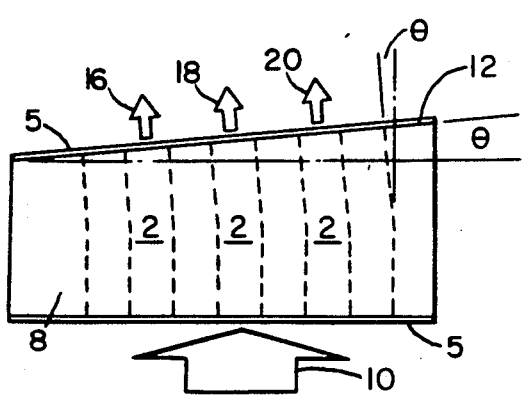
FIG. 3 is a top view of an array of three bandpass filters on a single substrate.

After film deposition is completed, the array of waveguides is cut using a precision saw to expose the ends of each waveguide 2 of FIG. 3. The waveguide 2 intersects each lateral end of the substrate 1 at a right angle. The ends of the waveguides 2 are polished and high reflectance mirrors 5 are deposited on the ends to form a resonant cavity.

The resonant cavity will filter only the intensity modulated light which has a a modulation wavelength which is two times the length of the resonator. The carrier wave is resonated within the cavity, while the optical signal which was carried thereon is permitted to exit the cavity through a hole in one of the end mirrors. In order to fabricate an array of filters with varying center frequencies, the substrate 1 is cut with a slight angle 0 as shown in FIG. 3. Each waveguide 2 is slightly curved to assure that it meets the lateral edge 12 of the substrate 1 perpendicular to the exiting light beams 16,18 and 20, as well as being perpendicular to the incident light beam 10. The bends in each waveguide 2 are spread out over the full length of the waveguide so as to keep radiation losses to a minimum. Both the curvature and the right angle intersections with the substrate edges perpendicular to the light beam are accurately controlled in the photolithographic process used to pattern the grooves and ridges 3 in the substrate 1.

As shown in FIG. 3, incident light beam 10 may consist of a single carrier frequency which will be injected into the bandpass filter fabricated to resonate a carrier which is half the wavelength of the modulation frequency, if such a filter has been provided in the array. Only the filtered light exiting as light beam 16, 18 or 20, will be modulated depending on which of the resonant cavities is cut to such a length as to be one half the modulation wavelength of the incident carrier wave. The three waveguides shown in FIG. 3 merely serve as an example. More or fewer waveguides may be used without exceeding the intended scope of the invention.

If the incident light beam 10 is frequency multiplexed, the carrier frequencies provided for in the filter array will be separated, and their accompanying signals transmitted out of the filter. Light beams 16, 18 and 20 will each be a different, discrete signal, with beam 16 having the highest frequency.

It will be evident that there are additional embodiments which are not illustrated above but which are clearly within the scope and spirit of the present invention. The above description and drawings are therefore intended to be exemplary only and the scope of the invention is to be limited solely by the appended claims.

We claim:

1. A monolithic array of RF bandpass filters for extracting light varying in intensity at a plurality of predetermined intensity modulation frequencies from light varying in intensity over a plurality of bands of intensity modulation frequencies comprising:

a substrate having an axis extending generally coaxially along the path of said light beam, said substrate having a plurality of grooves formed therein or ridges formed thereon extending along said axis;

a lower cladding layer formed over said substrate comprising a dielectric material having a selected refractive index;

a waveguide layer overlying said lower cladding layer and having a refractive index greater than the refractive index of said cladding layer and a thickness of at least 20 μm, wherein each location at which said waveguide layer overlies one of said plurality of grooves or ridges defines a; and first and second high reflectance mirrors at opposite boundaries of each said waveguide perpendicular to said axis, which define the length of each said waveguide equal to one half of the wavelength of one of a plurality of predetermined intensity modulation frequencies in said band of intensity modulation frequencies, the ends thereof defining a resonant cavity which permits resonance of light at each of said plurality of predetermined intensity modulation frequencies, a portion of the resonating light with each said resonant cavity exiting through one of said first and second mirrors as filtered output light varying in intensity at said predetermined intensity modulation frequency, each subsequent waveguide increasing progressively in length where said substrate increases laterally in width.

2. A monolithic array of RF bandpass filters as in claim 1 wherein said optical waveguide layer has a thickness in the range of 20 to 100 microns and an attenuation factor of not greater than 10 dB/m.

3. A monolithic array of RF bandpass filters as in claim 1 wherein each said waveguide curves to meet each lateral edge of said substrate at a 90 degree angle.

4. A monolithic array of RF bandpass filters as in claim 1 wherein the difference between the refractive index of said lower cladding layer and the refractive index of said waveguide layer is less than approximately 0.015.

5. A monolithic array of RF bandpass filters as in claim 1 further comprising an upper cladding layer formed over said waveguide layer comprising a dielectric material having a refractive index lower than the refractive index of said waveguide layer.

6. A method of forming a monolithic array of RF bandpass filters for extracting light varying in intensity at a plurality of predetermined intensity modulation frequencies from light varying in intensity over a band of intensity modulation frequencies which comprises:

forming a substrate having an axis adapted to be generally coaxial with the path of said light beam;

forming a plurality of grooves therein or ridges thereon extending along said axis;

forming on said substrate a lower cladding layer which comprises a dielectric material and has a refractive index;

forming over said lower cladding layer a waveguide layer having a refractive index greater than the refractive index of said cladding layer and having a thickness of at least 20 microns;

cutting said substrate at an angle which causes a plurality of said waveguides to increase progressively in length; and forming first and second high reflectance mirrors at opposite flat boundaries of each said waveguide perpendicular to said axis thereby defining the length of said waveguide equal to one half of one of a plurality of predetermined intensity modulation frequencies.

7. A method of forming a monolithic array of RF bandpass filters as in claim 6 wherein said deposition of said optical waveguide layer is by ultra high purity chemical vapor deposition.

8. A method of forming a monolithic array of RF bandpass filters as in claim 6 further comprising forming said waveguides in a laterally extending curve such that the boundary edges of each said waveguide are perpendicular to said axis.

9. A method of forming a monolithic array of RF bandpass filters as in claim 6 further comprising the step of forming over said waveguide layer an upper cladding layer having a refractive index lower than the refractive index of said waveguide layer.

10. A method of forming a monolithic array of RF bandpass filters as in claim 6 wherein said waveguide layer is grown to such sufficient thickness that the difference in index of refraction between both said lower and said upper cladding layers and said waveguide layer may be less than 0.015 while maintaining an attenuation factor of no greater than 10 dB/m.

* * * * *

UNITED STATES PATENT AND TRADEMARK OFFICE
CERTIFICATE OF CORRECTION

PATENT NO. : 5,002,352

DATED : March 26, 1991

INVENTOR(S) : Eric M. Bradley, et al.

It is certified that error appears in the above-identified patent and that said Letters Patent is hereby corrected as shown below:

Column 4, claim 1, line 9 after "a" insert --waveguide--;

Signed and Sealed this

Eighth Day of December, 1992

*Attest:*

DOUGLAS B. COMER

*Attesting Officer*      *Acting Commissioner of Patents and Trademarks*